US 9,303,818 B1
Apr. 5, 2016

(12) United States Patent
Hill et al.

(54) DENSE STORAGE OF HYDROGEN AND OTHER GASES IN FAST FABRICATED, HIERARCHICALLY STRUCTURED NANOCAPILLARY ARRAYS THROUGH ADSORPTION AND COMPRESSION BY ELECTROCHEMICAL AND OTHER MEANS

(71) Applicant: Mainstream Engineering Corporation, Rockledge, FL (US)

(72) Inventors: Justin J. Hill, Merritt Island, FL (US); Nicholas Schwartz, Rockledge, FL (US); Gregory Chester, Orlando, FL (US)

(73) Assignee: MAINSTREAM ENGINEERING CORPORATION, Rockledge, FL (US)

(*) Notice: Subject to any disclaimer, the term of this patent is extended or adjusted under 35 U.S.C. 154(b) by 100 days.

(21) Appl. No.: 13/969,941

(22) Filed: Aug. 19, 2013

(51) Int. Cl.
*F17C 1/14* (2006.01)
*H01M 8/04* (2006.01)
*B82Y 30/00* (2011.01)

(52) U.S. Cl.
CPC . *F17C 1/14* (2013.01); *B82Y 30/00* (2013.01); *H01M 8/04201* (2013.01)

(58) Field of Classification Search
None
See application file for complete search history.

(56) References Cited

U.S. PATENT DOCUMENTS

| | | | | |
|---|---|---|---|---|
| 8,076,034 B1* | 12/2011 | Lassila | ............... | B82Y 30/00 423/648.1 |
| 2004/0211679 A1 | 10/2004 | Wong et al. | | |
| 2005/0276743 A1* | 12/2005 | Lacombe | ............... | B82Y 30/00 423/447.3 |
| 2006/0013756 A1* | 1/2006 | Siochi | ............... | B82Y 10/00 423/447.1 |
| 2006/0119015 A1* | 6/2006 | Wehrspohn | ............... | B01D 67/0069 264/627 |

OTHER PUBLICATIONS

Hicks and Dresselhaus; Thermoelectric figure of merit of a one-dimensional conductor. Phys. Rev. B, 1993, (47), 16631-16634].

Kim, Stroscio, Bhatt, Mickevicius and Mitin; Electron-Optical-Phonon Scattering Rates in a Rectangular Quantum Wire. J. Appl. Phys., 1991, (70), 319-325.

Hill, Cotton and Ziegler; Alignment and Morphology Control of Ordered Mesoporous Silicas in Anodic Aluminum Oxide Channels by Electrophoretic Deposition. Chem. Mater., 2009, (21), 1841-1846.

Liu, Wang, Indacochea and Wang; Interference color of anodized aluminum oxide (AAO) films for sensor application, Sensors and Smart Structures Technologies for Civil, Mechanical, and Aerospace Systems 2009, (7292), 729217-11.

Hochbaurn, Chen, Delgado, Liang, Garnett, Najarian. Majumdar and Yang; Enhanced thermoelectric performance of rough silicon nanowires. Nature, 2008, (451). 163-167].

Huang, Sun and Sun, Effect of characteristic size on the effective thermal conductivity of anodic aluminum oxide (AAO) porous thin films, Adv. Mater. Res., 2012, (399-401), 641-645].

(Continued)

*Primary Examiner* — Alix Eggerding

(57) ABSTRACT

A novel high-density hydrogen and other gas storage material has been fabricated and enhanced to provide the opportunity to use hydrogen as a predominant energy source by using hierarchical and ordered nanoporous materials to provide a solution to the shortcomings of current storage technologies. These materials consist of high aspect ratio porous templates with aligned and periodic nanocapillaries that have a tunable density, diameter, and wall thickness. Not only is the disclosed process low-cost and scalable, but catalytic fabrication of carbon nanotubes (CNTs) within the nanocapillaries is achieved, thereby yielding coaxial nanocapillary arrays for physical and adsorbed hydrogen storage with ultra-high gravimetric and volumetric hydrogen storage densities.

15 Claims, 9 Drawing Sheets

Top-view of CNT/AAO pore

(56) References Cited

OTHER PUBLICATIONS

Fuqian Yang; Effect of surface energy on tensile deformation of nanotubes; Journal of Physics D: Applied Physics, IOP Publishing; Phys. 42 (2009).

Dwight D. Back, Charlie Ramos, and John A. Meyer, Mainstream Engineering Corporation, Rockledge, Florida; Low-Pressure Long-Term Xenon Storage for Electric Propulsion; NASA SBIR Final Report 1998.

Züttel, Sudan, Mauron, Kiyobayasni Emmenegger and Schlapbach; Hydrogen storage in carbon nanostructures. Int. J. Hyd. En., 2002, (27), 203-212.

Zhou; Progress and problems in hydrogen storage methods. Ren. Sust. En. Rev., 2005, (9), 395-408.

* cited by examiner

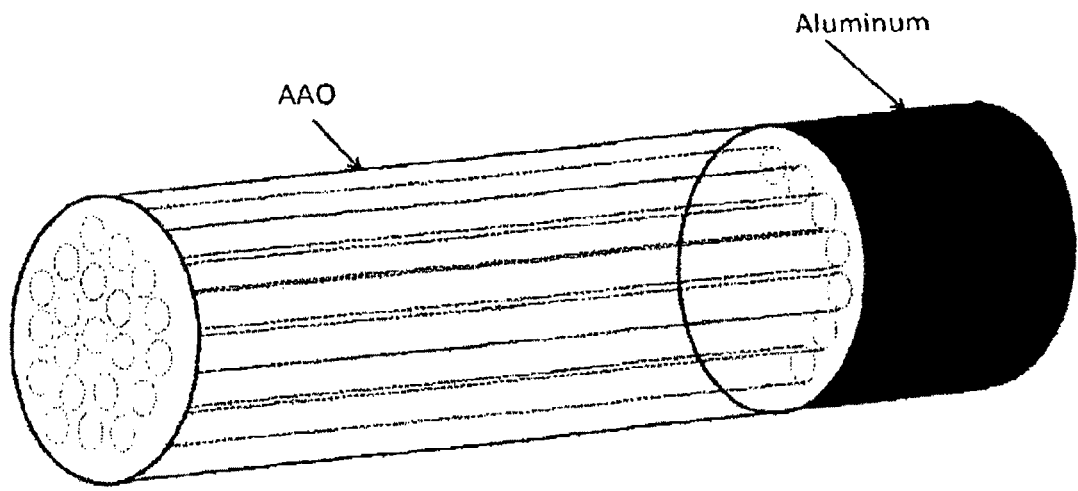
Figure 1A. An array of pores within the AAO
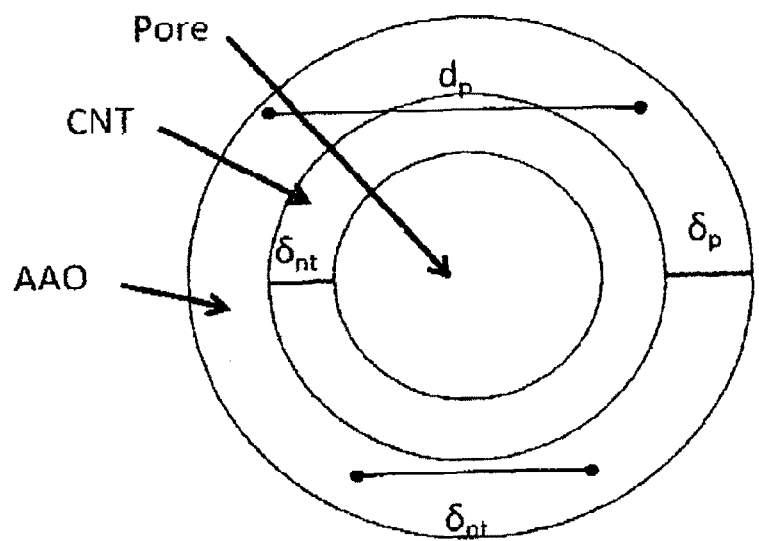
Figure 1B. Top-view of CNT/AAO pore

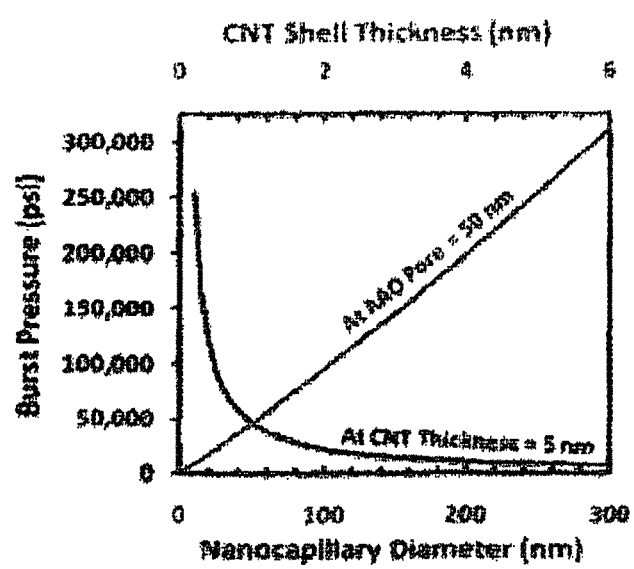
Figure 2. Burst pressure (safety factor of 4) of a nanocapillary pore versus diameter

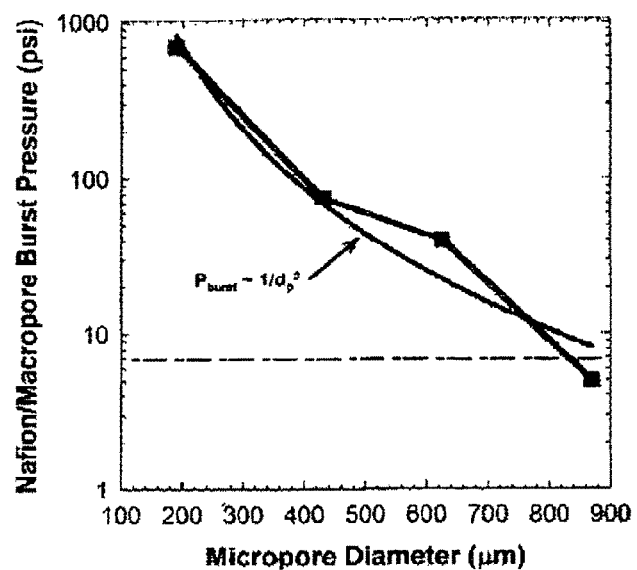
Figure 4: Experimental and predicted dependence of burst pressure on diameter for Nafion plug within AAO pores

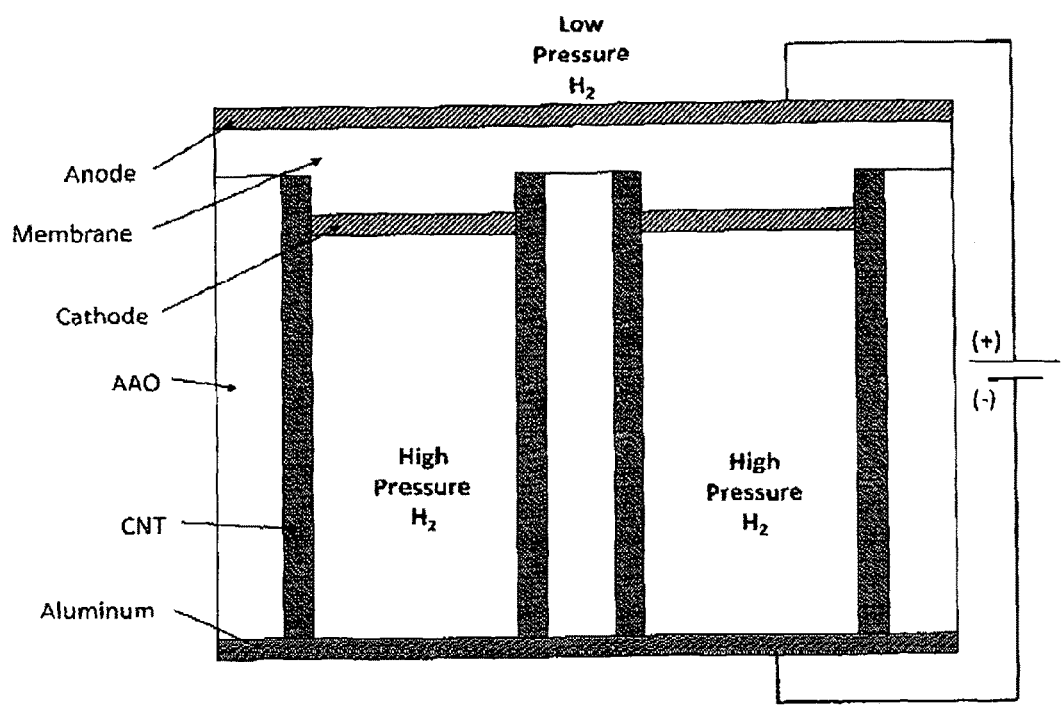
Figure 6: Electrochemical hydrogen compression mechanism integrated into anodized aluminum oxide nanocapillaries with carbon nanotube walls

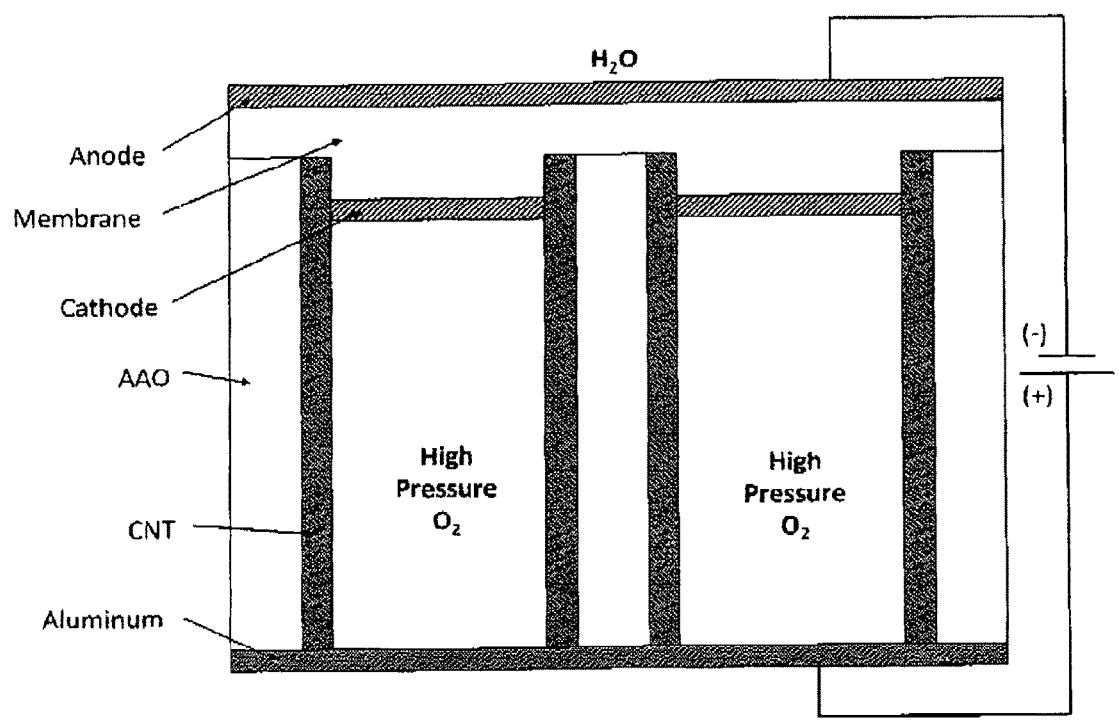
Figure 7. Water electrolysis oxygen compression mechanism integrated into anodized aluminum oxide nanocapillaries with carbon nanotube walls

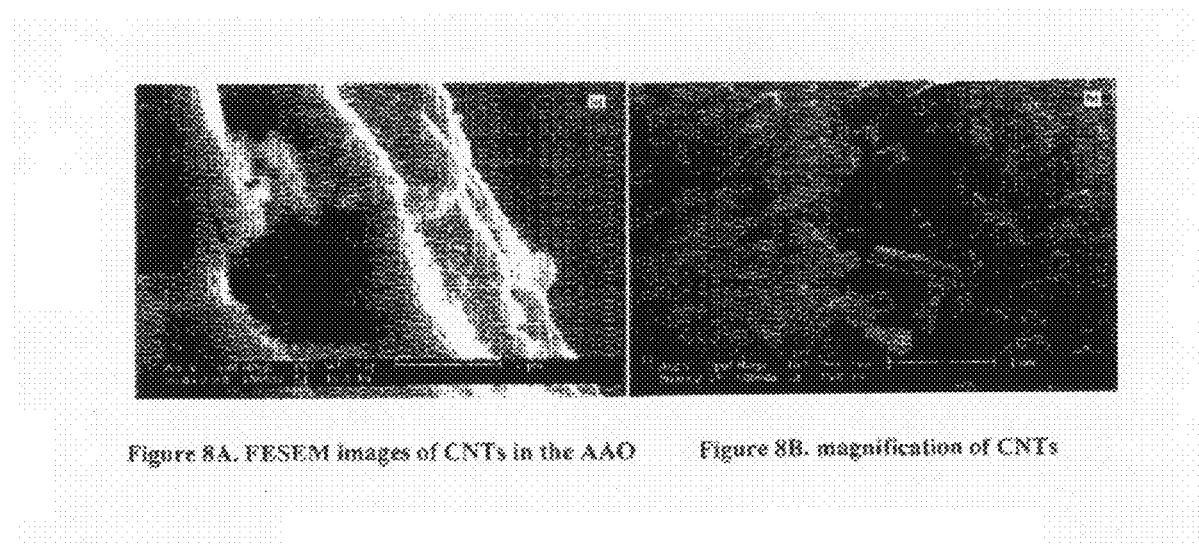
Figure 8A. FESEM images of CNTs in the AAO    Figure 8B. magnification of CNTs

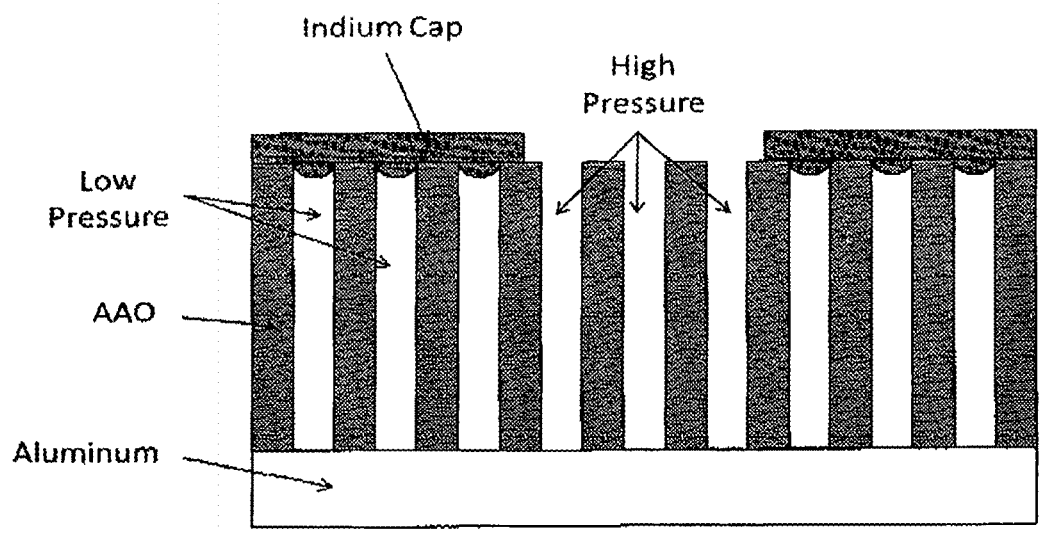
Figure 9. Schematic of an indium sealed AAO plug

DENSE STORAGE OF HYDROGEN AND OTHER GASES IN FAST FABRICATED, HIERARCHICALLY STRUCTURED NANOCAPILLARY ARRAYS THROUGH ADSORPTION AND COMPRESSION BY ELECTROCHEMICAL AND OTHER MEANS

CROSS-REFERENCE TO RELATED APPLICATIONS

This application is related to currently pending application Ser. No. 13/346,760 filed Jan. 10, 2012, Ser. No. 13/860,005 filed Apr. 10, 2013 and Ser. No. 13/863,010 filed Apr. 15, 2013, the disclosures of which are hereby incorporated in this application.

BACKGROUND AND SUMMARY OF THE INVENTION

The present invention is directed to ultra-high aspect ratio, hierarchical nanocapillary arrays and the like and a method for fast fabrication thereof, namely by combining temperature, voltage and acid concentration controlled electrochemical oxidation of aluminum as well as the growth of materials within each nanocapillary, such as carbon nanotubes through catalytic chemical vapor deposition. These hierarchical nanocapillary arrays can be either fabricated freestanding or fabricated directly on support materials such as electrically conductive or insulating material. Furthermore, inclusion of material within the hierarchical nanopores facilitates the directed fabrication of ultra-high aspect ratio and density nanocapillary arrays.

High-density hydrogen storage that can be safely transported and delivered still presents a major bottleneck in the shift from a hydrocarbon-based to a hydrogen-based energy infrastructure and as such, has become an area of intense research. Capillary-based storage is effective due to the high pressure tolerance of the glass microcapillaries as well as the fact that only a portion of the total contained hydrogen is stored in each capillary. As a result, rupture of the container would not result in a highly energetic release of all of the gas.

Hydrogen storage densities in glass microcapillaries are limited by the internal pressures that can be sustained by the microcapillaries. These pressures rely on the tensile strength of the glass, and this microcapillary fabrication technique is not likely to be able to be adapted for higher tensile strength materials. The natural surface area of these microcapillary arrays is low, and thus, storage enhancements through adsorption could only be obtained through impregnation of the microcapillaries with an absorbent, resulting in severely diminished volumetric storage.

A natural extension of this proven, commercialized technology is the construction of nanocapillary arrays through porous templates such as anodic aluminum oxide (AAO). Nanocapillary arrays enhance the storage pressure capabilities of microcapillaries through capillary diameter reduction and also produce massive surface areas, allowing for additional physical hydrogen storage through adsorption. The pore wall thickness to diameter ratio (which determines pressure tolerances) is highly "tunable", and the pore wall can be coated with a high tensile strength material, enabling maximum gravimetric ($G_c$) and volumetric ($V_c$) densities. If the pore wall is included with a higher tensile strength material such as carbon nanotubes (CNTs), the pressure tolerance of the pore can be increased by over 20 times that of a similarly sized glass capillary. In addition, CNT growth in microcapillaries is not possible due to the diameter of the capillary. CNTs also adsorb hydrogen; which, combined with a 100,000-fold increase in surface area from the AAO, physical storage through enhanced compression in nanocapillaries and CNT-hydrogen adsorption can drastically enhance this safe, proven method of storage with a CNT/AAO nano-material hybrid structure. Hydrogen adsorption has been shown to be as high as 15% by weight and projected to be up to 100% in CNTs. [Züttel, Sudan, Mauron, Kiyobayashi, Emmenegger and Schlapbach; *Hydrogen storage in carbon nanostructures*. Int. J. Hyd. En., 2002, (27), 203-212.] Gas compression in nanocapillaries is expected to achieve capillary condensation at low pore diameters. This results from the surface curvature/energy of the nanocapillary and should enhance storage density as well as reduce the energy required to pressurize the nanocapillary array.

AAO nanocapillary arrays can be fabricated with a total diameter (overall storage container diameter) of virtually any size, making the self-assembly fabrication process highly scalable. The individual pores can range from 10 to 500 nm, with pore densities ranging from $10^8$ to $10^{12}$ pores/cm$^2$. The wall thickness of each individual pore, as fabricated, is typically the same as the pore radius. However, the wall thickness can be decreased by simple etching in a dilute acid or increased by coating of the pore wall or growth of a nanotube within the pore (such as CNTs).

In a currently preferred embodiment of our invention, these high aspect ratio nanocapillary arrays can be used for compression and adsorption-based gas storage for materials such as hydrogen, gas, krypton, xenon and the like. In addition, the nanocapillary arrays can be incorporated with materials that facilitate electrochemical gaseous compression of certain gases by electrolyzing and subsequently transporting low-pressure gas outside of the nanocapillary into its interior, with the gas being pressurized within each nanocapillary. Our process of applying high potentials at low temperatures results in the fast fabrication of conformal (or conformable) hierarchical nanocapillary arrays which are grown on any shaped support so long as the initial support is composed of aluminum, zinc, tin, antimony, titanium, magnesium, niobium, tantalum or any other metal that undergoes electrochemical formation of ordered nanopores. The fabrication methods of the present invention result in more than a 100-fold advance over the state-of-the-art techniques.

The materials listed are known producers of arrayed nanopores under anodic electrochemical oxidation (abbreviated herein forth as "anodization" or "anodized"). In other contemplated embodiments these nanocapillary arrays can be leveraged in applications where ultra-high surface area, vertically oriented and arrayed nanocapillaries are desired such as in batteries, capacitors, electrochemistry, chemical conversion, photovoltaic devices as well as many other chemical and physical applications. Our technology is not only applicable to hydrogen as a gas storage media, but also other gases such as xenon and krypton (for applications in ion propulsion systems for next-generation spacecraft) or gas (for self-contained breathing apparatuses or breathing gas). In addition to gaseous storage, the developed nanomaterial can be used to increase charge collection efficiency in nanostructure photovoltaics, increase energy density in supercapacitors as well as provide ultra-high surface area scaffolding for catalysis and thermal energy storage.

BRIEF DESCRIPTION OF THE DRAWINGS

These and other features, objects and advantages of the present invention will become more readily apparent from the following detailed description when taken in conjunction with the accompanying drawings wherein:

FIG. 1a is a schematic drawing depicting the overall high aspect nanocapillary array forming a gas storage container;

FIG. 1b is a schematic, cross-sectional view of the individual nanocapillary shown in FIG. 1a and illustrating the pore, CNT shell and alumina nanocapillary wall thereof;

FIG. 2 is a graph showing the calculated burst pressure of an individual nanocapillary in relation to both nanocapillary diameter and included CNT shell thickness;

FIG. 4 is a graph illustrating the experimental and predicted dependence of burst pressure on diameter for a Nafion plug within AAO pores;

FIGS. 6 and 7 are, respectively, schematic diagrams of AAO nanocapillaries with CNT-covered walls integrated into the electrochemical hydrogen compression mechanism and integrated into a water electrolysis oxygen compression mechanism;

FIG. 8a is a wide-field view SEM image of CNTs grown within hard anodized nanocapillary arrays;

FIG. 8b is a near-field view SEM image of CNTs grown within hard anodized nanocapillary arrays; and FIG. 9 is a schematic drawing of an indium sealing and burst pressure test conducted on the nanocapillary arrays.

DETAILED DESCRIPTION OF THE DRAWINGS

Figure 3A:
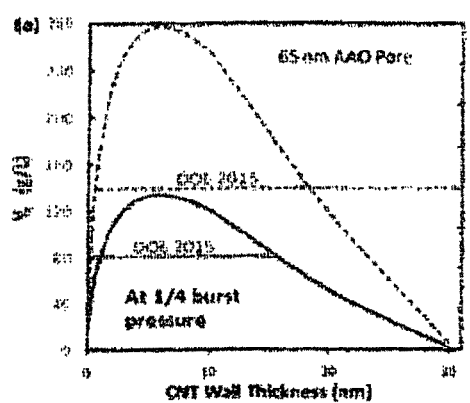
FIG. 3a is a graph showing the calculated gravimetric (mass $H_2$/system mass) and volumetric (mass $H_2$/system volume) hydrogen storage densities at one-fourth (¼) burst pressure within an array of 65 nm diameter nanocapillaries as a function of included CNT shell thickness.

FIGS. 1 (a) and 1(b) are schematic, not-to-scale illustrations of our currently contemplated coaxial CNT/AAO nanocapillary array and the dimensions of an individual pore with an AAO encasing a CNT, respectively. FIG. 1a shows a gas storage vessel consisting of $10^9$-$10^{12}$ nanocapillaries/cm² that, individually, have identical diameters and lengths that can be controlled to range between 10-100's nm and 1 nm-10's cm, respectively. These nanocapillaries individually have extremely high burst pressures, up to 300,000 psi, and when formed in an array will synergistically balance the pressure force within each nanocapillary to further increase the burst pressure of the overall vessel. The alumina nanocapillary array is produced via electrochemical anodization-based self-assembly of aluminum. One end of the nanocapillaries can be capped with non-oxidized aluminum and the other end can be sealed with a metal, polymer or epoxy material. The pore density can be quite high, resulting in an extremely high surface area and volumetric storage that approaches the volume of the bulk storage container. Also shown in FIG. 1 (a) is the same safety feature that is obtained with glass microcapillary arrays: capillaries within the overall containment vessel individually hold small amounts of the high-pressure gas (or liquefied gas), such as hydrogen, krypton, or other gases. This safety enhancement is significant when compared to storage of high-pressure hydrogen in a gas cylinder because rupture of a cylinder would result in an extremely energetic release and possible explosion of the stored gas. In contrast, due to the individual nanocapillaries, a rupture of the apparatus shown in FIG. 1 the illustrated storage vessel would only result in the release of a small portion of the total stored hydrogen gas that was contained in specific damaged nano storage vessels. The safety of the nanocapillary arrays is further enhanced through the modularity of the device by storing high volumes of gas in a large number of small nanocapillary arrays. The parallel connection between small, high-pressure nanocapillary arrays allows for partial release of stored gasses in order to meter the gas output of the device while the small size allows for the device to store high volumes of gasses in smaller, portable vessels. In addition, partial containment rupture is unlikely to induce complete containment failure due to this feature.

FIG. 1 (b) highlights the enhancements due to volumetric and adsorbed hydrogen storage through both the dimensions and hierarchical structure of the coaxial AAO/CNT nanocapillary. Specifically, FIG. 1(b) is a cross section of an individual nanocapillary having a CNT that lines the nanocapillary wall to act as a structural reinforcement and an additional gas adsorption material. Virtually any material capable of providing structural support or gas adsorption capacity can be used, however, to coat the pore wall. CNT inclusion within each nanocapillary further strengthens the nanocapillary structure by as much as 1000-fold. Each individual pore has a "tunable" overall diameter, $D_p = d_p + 2\pm_p$, through the electrochemical growth process. Furthermore, the pore wall thickness, $\pm_p$, and inner diameter, $d_p$, can be tuned following AAO fabrication. Tuning $\pm_p$ and $d_p$ within the confines of $D_p$ allow for the systematic adjustment of the pressure tolerance of the pore and the overall vessel void volume and weight. FIG. 1b also shows that the CNT can be grown along the walls of the AAO pore. The CNT internal structure enhances the tensile strength of the individual pore and increases the pore surface affinity for hydrogen adsorption. Through CVD (chemical vapor deposition) growth of the CNT within the AAO pore, the outer diameter of the CNT will be identical to $d_p$, with a wall thickness, $\pm_{nt}$, ranging from 0.1-30 nm.

Given the dimensions shown in FIG. 1 (b), an estimate of the sustainable pressure (referred to as burst pressure, $P_{burst}$) of the coaxial pore can be calculated as $$P_{burst} = \sigma_{nt} \frac{2\delta_{nt}}{d_{nt}} \left(1 + \frac{E_p}{E_{nt}} \frac{\delta_p}{\delta_{nt}} \left(\frac{d_{nt}}{d_p}\right)^2 \right) \quad (1)$$

where $E_i$ and $\sigma_i$ are the elastic modulus and tensile strength of the CNT and pore, respectively. The term outside of the parenthesis is $P_{burst;nt}$, the burst pressure of an individual CNT. The factor multiplying this term is the pressure enhancement obtained by the presence of the alumina shell around the CNT. This term only enhances $P_{burst}$ as long as the contact pressure between the CNT and the inner AAO pore wall does not exceed the burst pressure of the AAO pore. The condition when this is satisfied can be written solely in terms of the material properties and dimensions of the CNT and AAO, $$\frac{E_p}{E_{nt}} \frac{d_{nt}}{d_p} - \frac{\sigma_p}{\sigma_{nt}} \leq 0 \quad (2)$$

which provides a constraint on Eqn. (1) and dictates when the enhancement term collapses to unity. Using Eqns. (1) and (2) along with information about the AAO pore density, $2\pm_p = d_p$, hydrogen density at high pressure as well as the material properties of coaxial pore, $G_c$ and $V_c$ can be optimized with respect to $d_p$, $2\pm_p=d_p$ and $\pm_{nt}$. As stated earlier, $d_p$, $2\pm_p=d_p$ and $\pm_{nt}$ can be varied quite easily. The trend in burst pressure calculatable by Eqn. (1) is plotted for a ratio of $2\pm_p=d_p=0:1$ and two cases: varying CNT shell thickness at a nanocapillary diameter of 50 nm and a varying nanocapillary diameter with a fixed CNT shell thickness of 5 nm. A safety factor of 4 was used for this particular burst pressure calculation. More specifically, FIG. 2 is a graph which contains the data from a hoop-stress calculation of the burst pressure of an individual nanocapillary as it depends on both the CNT shell thickness and the nanocapillary diameter. Incorporated into this calculation is a safety factor of 4. Burst pressure trends with CNT wall thickness linearly and drops off drastically with nanocapillary diameter up to approximately 100 nm. However, a 50 nm diameter nanocapillary which is included with a CNT having a wall thickness of 6 nm has a burst pressure in excess of 300,000 psi. These calculations, however, do not include any pressure balancing that would occur in the honeycombed matrix of nanocapillaries which would lead to further enhancements in burst pressure.

Figure 3B:
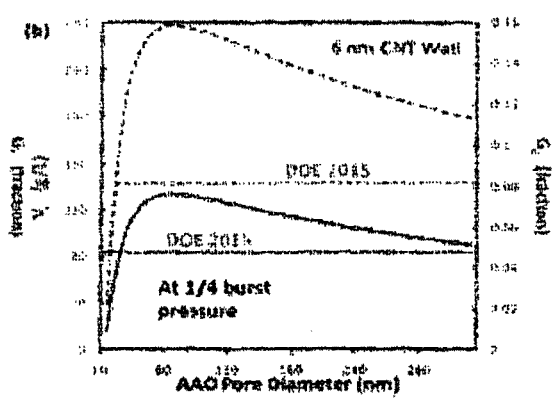
FIG. 3b is a graph showing the calculated gravimetric (mass $H_2$/system mass) and volumetric (mass $H_2$/system volume) hydrogen storage densities at one-fourth (¼) burst pressure within an array of 6 nm wall thickness CNTs included in nanocapillaries as a function of nanocapillary diameter.
Figure 5A:
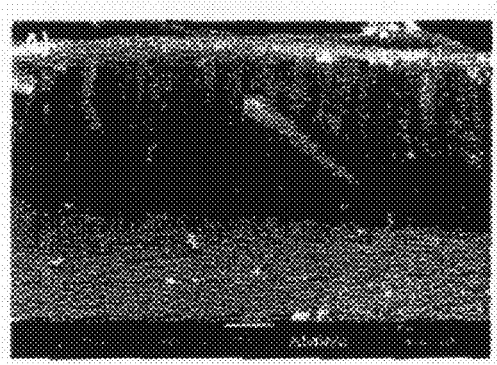
FIGS. 5a-5d are cross-sectional images of nanocapillary pores with Nafion after soaking in sodium dodecyl sulfate (SDS)
Figure 5B:
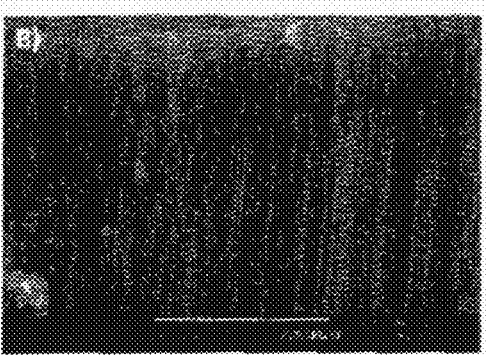
Figure 5C:
Figure 5D:
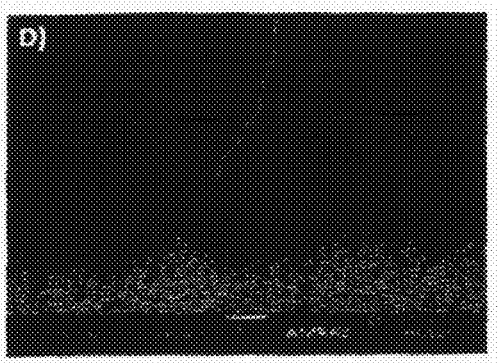

FIGS. 3 (a) and (b) depict the predicted gravimetric and volumetric storage densities as a function of CNT wall thickness and AAO pore diameter based on experimental data concerning the density of hydrogen (liquid and gas) under compression. FIG. 3(b) is a similar calculation to that of FIG. 3(a), but only as a function of nanocapillary diameter in the former. While both storage density values drop off sharply as CNT wall thickness is increased, the decline in storage density decreases slower as nanocapillary diameter increases and is mostly the result of a lower burst pressure for increasingly large nanocapillaries. The results of the calculations shown in FIGS. 3 (a) and (b) demonstrate that CNT/AAO hierarchical structures should reach gravimetric and volumetric storage densities of 0.16 and 130 g/L, respectively, with a storage container constructed of an array of 65 nm AAO pores with a 6 nm CNT pore wall inclusion. These calculation, are based upon a lone coaxial tube. The tolerances of a nanocapillary array that shares pore walls with neighboring capillaries will likely increase due to a synergistic balance of pressures across the array. Also not considered in this example is capillary condensation of $H_2$ gas due to the high pressures and small pore size. Capillary condensation of hydrogen could occur in 2-50 nm diameter pores at elevated pressures, although this has not been rigorously substantiated in practice. [4: Zhou; *Progress and problems in hydrogen storage methods*. Ren. Sust. En. Rev., 2005, (9), 395-408]. Furthermore, the pressures used to calculate the values (i.e., ¼ $P_{burst}$) range from $10^3$ to $10^4$ atm. Although these pressures are extremely high, a simple method to fill and seal glass capillary arrays has been developed elsewhere [See, e.g. '*ZHEVAGO and DENISOV; APPARATUS FOR STORAGE AND LIBERATION OF COMPRESSED HYDROGEN GAS IN MICROCYLINDRICAL ARRAYS AND SYSTEM FOR FILLING THE MICROCYLINDRICAL ARRAYS* 2008, (U.S. Pat. No. 7,870,878] and is currently being used on a commercial scale.

A similar calculation can be performed for Kr or Xe given information concerning the equation of state for the gas/liquid as well as the degree to which the material adsorbs to graphitic media. Mainstream Engineering Corporation, the assignee of this application, has performed several NASA SBIR Phase I and Phase II contracts that investigated the degree of noble gas adsorption on graphitic media. [See, Back and Scaringe; *Low-Pressure Long-Term Storage of Xe for Electric Propulsion. SBIR Final Report,* 1998]A correlation was developed, and it was found that graphite can adsorb 2-3 times its weight in Xe or Kr.

The storage density of Kr in these hierarchical structures is significantly different than that of hydrogen as shown in FIGS. 3 (a) and (b). This could be due to a constant, 1% by weight adsorption of hydrogen in the CNT, and also due to the liquid compressibility of hydrogen, one of the most compressible liquids known. Although increasing CNT wall thickness increases both storage densities monotonically at an assumed AAO pore diameter of 275 nm, there is an apparent maximum storage density reached at an AAO pore diameter of 275 nm (based on a 6 nm CNT shell).

Capping Methods

In addition to the pressure capabilities of the nanocapillary, another important consideration is the pressure tolerances on a seal required to keep gas from escaping the open end of the nanocapillary. A method of introducing a metal melt onto the open end of the pores to seal the capillaries has been previously developed. The adhesive force between the nanocapillary and the seal will be further enhanced due to an increase in surface energy with decreasing pore diameter. [See, Fuqian; *Effect of surface energy on tensile deformation of nanotubes*. J. Phys. D, 2009, (42), 165410]. The surface energy, which is related to adhesive force, is known to increase dramatically with increasing pore curvature so the seal on a nanocapillary can withstand higher pressures than that of a microcapillary. Additionally, the adhesive force of the seal within the nanocapillary is known to depend on the surface energy and thus the pore diameter.

After the hydrogen or other gas is pressurized within the nanocapillary array and the array is capped, the sealed nanocapillary array is returned to ambient pressure. To release the contained pressurized gas, the cap is heated until molten, and the pressurized gas will vent from the unblocked pores. The amount of high-pressure gas released is easily controlled by controlling the area of the surface that is heated (uncapped).

As mentioned earlier, Mainstream Engineering Corporation is developing ways to integrate materials that cap and seal the high pressure nanocapillary vessels and simultaneously act as an ion exchange membrane for the gas compression system. Micro-scale experiments have been conducted to predict nano-scale blowout pressures for ion exchange membrane materials within AAO pores. Preliminary experimental results predict the blowout pressure of 100 nm AAO pores to exceed 100,000 psi. That correlation is shown in FIG. 4 which demonstrates the experimental and predicted blowout pressure dependence of Nation within AAO pores. Based on micro-scale blowout experiments the anticipated blowout pressure is expected to exceed 100,000 psi at diameters of 100 nm. A ion exchange membrane material (Nafion) was cast into machined blowout pressure test caps and pressurized until the cast membrane failed to hold pressure. These developments have also shown that ion exchange materials can be filled into the nanocapillary arrays (see FIGS. 5(a)-(d) which are a compilation of SEM images showing Nafion filling within AAO nanopores after the nanocapillary array was pre-soaked in sodium dodecyl sulfate ("SDS"). The SDS acts as a surfactant that binds to the alumina walls and the membrane material. Integration of the nanocapillary pores with the membrane material demonstrates the ability to cap and seal the gas storage material)

Pumping Techniques

Adiabatic compression-based pressurization uses mechanical work and thermal management to physically compress a gas. The mechanism of gas compression can vary and typically compression of the gas is exothermic, requiring the removal of heat to continue compression. To supplement this process, refrigeration can be used which reduces the mechanical work required to compress the gas. The simplest form of adiabatic compression is within a cylinder-sheathed piston by which forcing the piston into a cylinder compresses a gas and generates heat that must be removed.

Electrochemical hydrogen compression is a relatively new technology that has stimulated much interest as it uses no moving parts and relies entirely on the application of a static electric field to compress hydrogen. [See, Wong, Girard and Vanderhoek; *Electrochemical Hydrogen Compressor.* 2004, (US 2004/0211679 A1 205/765; 204/242)}. In addition, upstream hydrogen can be at ambient pressures and temperatures, thereby adding to the safety of the compression process.

Electrochemical hydrogen compression works like a symmetric proton exchange layer within a fuel cell. A schematic of the process is shown in FIG. 6 which is a diagram of AAO nanocapillaries with CNT-covered walls integrated with the electrochemical hydrogen compression mechanism. Working much like a hydrogen fuel cell, low-pressure hydrogen gas is catalytically ionized via Pt hydrogen splitting on a proton exchange membrane. The electric field then drives the hydrogen ions through the membrane via an externally applied electric field. Upon transport through the membrane, a Pt-catalyst reforms the hydrogen ions and hydrogen gas is formed on the inside of the nanocapillary. Hydrogen is pressurized within the nanocapillary and the final pressure value obtained is partially determined by the ambient hydrogen pressure and mostly determined by the applied electric field. On the anode/low-pressure side of a proton exchange membrane (PEM) is a catalyst performing the forward reaction, $H_2 \rightarrow 2H^+ + e^-$, separating the hydrogen molecule to hydrogen ions. These ions are soluble in the PEM material and are driven through it by the application of an electric field between the anode/low-pressure side and the cathode/high-pressure side. Upon reaching the cathode/high-pressure side of the PEM layer, an identical catalyst material performs the reverse reaction, $2H^+ + e^- \rightarrow H_2$, which reforms the hydrogen molecule. The rate at which hydrogen is driven across the membrane is governed by the current and the ultimate pressure obtainable on the high pressure side is driven by voltage. Furthermore, this process has been demonstrated to be remarkably efficient, very near the theoretical limit of reversible compression, using 5- to 10-times less energy than adiabatic compression.

Electrochemical gas pumping can be accomplished by water electrolysis with a proton exchange membrane as shown in FIG. 7. Liquid water is supplied to the cathode side (low pressure) of the membrane electrode assembly (MEA). Water penetrates into membrane and reacts at the anode, forming gas, electrons, and protons. Hydronium is formed and carries charge through the membrane back where it recombines with the electrons and forms hydrogen. Current technology has demonstrated the ability to compress gas through water electrolysis based on PEM technology up to 3,000 psi with a fuel cell configuration. These systems have been limited due to supporting the membrane against the large pressure differential. Much higher gas pressures can be achieved by supporting the membrane with the highly ordered nanoporous array. In this manner, each nanocapillary will be filled with compressed gas individually through the electrochemical pump. Due to the high blow out pressure of the capping material and the mechanical strength enhancement in this system, much higher pressures are expected than the demonstrated fuel cell configuration.

This technology can be incorporated into nanocapillaries and should benefit significantly from the nanocapillary geometry. With our invention, the adhesion force of a very small plug within a nanocapillary can withstand extremely high (>100,000 psi) pressures before blow-out. The limit of the known electrochemical hydrogen compressor is primarily due to structural constraints. Thus, incorporation of: (1) a PEM material as the nanocapillary plug, (2) a catalyst on either side of the plug, (3) using the CNT within the nanocapillary as the cathode on the high pressure side and (4) application of a low-pressure side anode create a nano-electrochemical hydrogen compressor within each nanocapillary with the ability to structurally withstand much higher pressures. This hydrogen storage technology will allow for fabrication and sealing of the nanocapillary arrays, followed by hydrogen filling from ambient hydrogen simply using a voltage source. This method is much safer than adiabatic compression and allows for field-based refilling systems. The user would only need to carry a small tank of low-pressure hydrogen. Or, in the case of pipeline-based hydrogen transportation, filling stations would only require ambient pressure hydrogen delivery, mitigating much of the danger associated with pipeline hydrogen delivery.

AAO templates achieve a wide variety of thicknesses, pore diameters, and spacing, providing an ideal architecture to prepare highly ordered, periodic, and coaxial nanocapillaries. Furthermore, the well-defined geometry and ability to control the template structure enable the CVD growth of CNT arrays within the nanocapillaries as shown in FIGS. 8(*a*) and (*b*). More specifically, FIG. 8(*a*) is a wide-field, cross sectional SEM image of a CNT/AAO coaxial nanocapillary array which highlights that every individual nanocapillary is included with a CNT. FIG. 8(*b*) is a near-field, cross sectional SEM image of a CNT/AAO coaxial nanocapillary array which highlights that each nanocapillary and CNT have identical inner and outer diameters, respectively. This architecture allows for a wide range of flexibility in nanocapillary (and subsequent CVD grown CNTs) diameter, length, wall thickness, and spacing. The template remains well adhered to the remaining aluminum, making it an ideal structure for the directed formation of catalytic nanostructures and subsequent CNT CVD growth. This property also makes these structures capable of tolerating wide temperature cycles as is often found in space. Because of the tight distribution in pore sizing and self-ordered hexagonal pattern, AAO nanocapillary arrays provide an excellent architecture for the templated patterning of nanostructured platforms for CNT growth. Further, the thickness of the initial aluminum ingot as well as the pore size can be adjusted by changing the oxidation parameters, allowing for control of the aspect ratio and packing density of these nanostructures. The ability to control these parameters allows for the systematic study of hydrogen storage densities on CNT/AAO diameter, length, wall thicknesses, and array density.

Whether the CNTs are multi-walled or single-walled, carpeted growth of CNTs relies on seeded-formation from a liquid catalytic nanoparticle. While under inert vacuum, a thin film of the catalytic material is heated to melting. Liquid nano-droplets form due to precise selection of the substrate material so that the catalyst melt has an acute contact angle with the substrate. This is necessary to inhibit nano-droplet coalescence and aid in droplet diameter uniformity. These problems are common and can arise from substrate surface roughness, non-uniform substrate heating, and a multitude of other factors, all of which lead to a subsequently non-uniform CNT array.

Upon droplet formation, a precursor gas is flowed across the droplet array containing CNT precursor chemicals (acetylene, $H_2$, ammonia, etc). The CNT growth process is still not fully understood but it is generally accepted that these gases are broken down into radicals, react, and dissolve into the droplet, where they are expelled as CNTs upon supersaturation of the precursor carbon within the droplet.

Capillary condensation of hydrogen or krypton has been predicted to occur in pore diameters as small as 50 nm but has yet to be proven. [See. e.g., Zhou; *Progress and problems in hydrogen storage methods*. Ren. Sust. En. Rev., 2005, (9), 395-408.] This phenomenon would drastically increase the storage density and pressurization power requirements of the nanocapillary array due to the capillary surface curvature induced phase change of the gas.

Incorporation of CNTs into the pores of AAO nanocapillary arrays provides over a 250-fold increase in the mechanical strength of the AAO nanocapillary, but CNTs also will increase hydrogen storage through adsorption. Extension of this concept to CNT/AAO nanocapillary array hybrid materials allows for a tunable approach of enhanced gravimetric and volumetric hydrogen storage densities.

The assembly of catalytic nanostructures and ultimate fabrication of coaxial CNT/AAO nanocapillaries is an attractive way of producing high-pressure-tolerant nano-material hybrid storage devices. These systems allow for good control over the length, diameter, orientation, and wall thickness. Due to lower capillary diameter, AAO has better mechanical stability and strength than glass microcapillary arrays or anodized $TiO_2$ templates, and thicker films are possible than with polymer templates. Furthermore, CNTs are the strongest materials known to exist. As such, nanocapillary wall reinforcement of the AAO with CNTs will (1) dramatically increase the nanocapillary array pressure tolerance, (2) allow for enhanced surface adsorption of hydrogen in the ultra-high surface area array, and (3) possibly display hydrogen capillary condensation behavior for further enhanced storage.

After CNT growth, the nanocapillary arrays changed from white/gray in color to black, signifying the presence of CNTs. To verify growth, the samples were cross-sectioned and imaged with a field emission gun scanning electron microscope. The images in FIGS. 8(*a*) and (*b*) verify the presence of the CNTs as well as the fact that they completely fill the length of the nanocapillary arrays and fill nearly 100% of the pores. This is the first report of >1 mm CNTs grown in AAO. Raman spectroscopy was performed to assess the quality (degree of crystallinity) of the CNTs. Given the slower growth procedure used, we expect that the multi-walled CNTs are low in defects and highly crystalline. This will yield additional pressure support when the nanocapillary arrays are pressurized. Furthermore, upon additional analysis of the FESEM images, the CNT wall thickness is approximately 20 nm. This allows for a substantial increase in hydrogen storage through adsorption of the gas by the CNT. Adsorption isotherm measurements verify the uptake of hydrogen in these hierarchical nanocapillary arrays.

An initial pressure test has been conducted to determine the burst pressure of the bare (non-CNT filled) nanocapillaries which was calculated to be 18,000 psi for a lone nanocapillary. The exact burst pressure of an array of nanocapillaries is more difficult to calculate.

The AAO sample was pressurized from 5,000 psi to 25,000 psi at 5,000 psi intervals in a high-pressure testing apparatus. First, the outer-most nanocapillaries in the processed anodized aluminum oxide sample were sealed with a film of indium as shown in FIG. 9 which is a schematic drawing of the sealing mechanism used to perform hydrostatic burst pressure measurements. Indium is melted under nitrogen and allowed to cap an annular region of the nanocapillary array. The indium cap can withstand pressures exceeding 100,000 psi and as a result, the pressure in the nanocapillaries that are In-capped remains approximately constant/ambient. Upon hydrostatic pressurization, the inner nanocapillaries are filled with the high pressure fluid and a pressure differential is placed across the annular region. Burst pressure is approximated by systematically pressurizing the array and visual inspection for structure collapse. This testing methodology ensured that the outside nanocapillaries were sealed at atmospheric pressure. Then, the sample was exposed to high pressure in a high-pressure testing apparatus where only the nanocapillaries in the center of the AAO sample were exposed to this pressure. Burst pressure is obtained by observation prior to each pressurization run, examining the sample for implosion in the area of the indium melt-capping.

At each step, the sample was placed under a microscope to detect any physical damage that may be visible from the surface. To determine the burst pressure of each nanocapillary, we developed a test method for estimating this pressure using a hydrostatic pressure testing assembly rated to 25,000 psi. No observed implosion of the nanocapillaries was observed up to this pressure limit, indicating that the nanocapillary arrays are more pressure tolerant than hoop-stress calculations predict for an individual nanocapillary.

While we have shown and described our currently preferred embodiments of the present invention, we do not intend to be limited to the details shown and described herein but intend to cover all changes and modifications fairly encompassed by the scope of the appended claims.

We claim:

1. A gas storage device, comprising a support on which ordered pores are formable, a template comprised of at least one high-density, high-aspect ratio nanocapillary array with one end thereof on the support, with the array having aligned, individual nanocapillaries formed in a preselected and coaxial pattern and another end thereof selectively sealable and unsealable, and a coating formed on walls of the nanocapillaries and selected from a material such that the nanocapillaries are structurally reinforced.

2. The device according to claim 1, wherein the coated nanocapillaries are provided with a selected density, diameter and wall thickness suitable sized to obtain enhanced compression and adsorbed gas storage with ultra-high gravimetric and volumetric gas storage densities.

3. The device according to claim 1, wherein the at least one array is one of formed freestanding and directly on the support.

4. The device according to claim 1, wherein the support is selected from one of electrically conductive and insulating material.

5. The device according to claim 1, wherein the coating consists of a carbon nanotube formed within the nanocapillaries and along the nanocapillary walls.

6. The device according to claim 1, wherein the support is selected from one of aluminum, zinc, tin, antimony, titanium, magnesium, niobium, and tantalum to produce the arrays via anodic electrochemical oxidation.

7. The device according to claim 1, wherein one of hydrogen gas, oxygen gas, krypton gas and xenon gas is stored within the coated nanocapillaries.

8. The device according to claim 1, wherein an ion exchange material is filled into the other end of the nanocapillaries for effecting capping, sealing and electrochemical compression of gas within each nanocapillary.

9. The device according to claim 1, further comprising an ion exchange membrane operatively associated with the nanocapillaries for sealing and compressing one of hydrogen gas and oxygen gas within the nanocapillaries.

10. The device according to claim 1, wherein the support and template comprise a module configured to be operatively associatable with at least one additional module so as to constitute a system of modules.

11. A gas storage method, comprising supplying an electrolyzed gas or liquid at a first pressure to the nanocapillaries of the device according to claim 1, and thereafter introducing the gas into the nanocapillaries to store the gas therein at a second pressure higher than the first pressure.

12. A method for producing gas storage device, comprising providing a support on which ordered pores are formable, forming a template comprised of at least one high-density, high-aspect ratio nanocapillary array with one end thereof on the support, with the array having aligned, individual nanocapillaries formed in a preselected and coaxial pattern and another end thereof selectively sealable and unsealable, and forming a coating on walls of the anocapillaries, the coating being selected from a material such that the nanocapillaries are structurally enforced and are provided with a selected density, diameter and wall thickness suitable sized to obtain enhanced compression and adsorbed gas storage with ultra-high gravimetric and volumetric gas storage densities.

13. The method according to claim 12, wherein the template is formed by electrochemical oxidation.

14. The method according to claim 12, wherein the support is selected from one of aluminum, zinc, tin, antimony, titanium, magnesium, niobium, and tantalum.

15. The method according to claim 14, wherein the template is formed on the support as anodized metal oxide as a result of electrochemical oxidation so as to obtain controlled orientation and dimensions of pores during oxidation of the metal substrate.

* * * * *